Aug. 24, 1965          D. F. FATHAUER          3,202,910
AUTOMOTIVE TACHOMETER USING A SWITCHED TRANSISTOR
Filed May 13, 1958
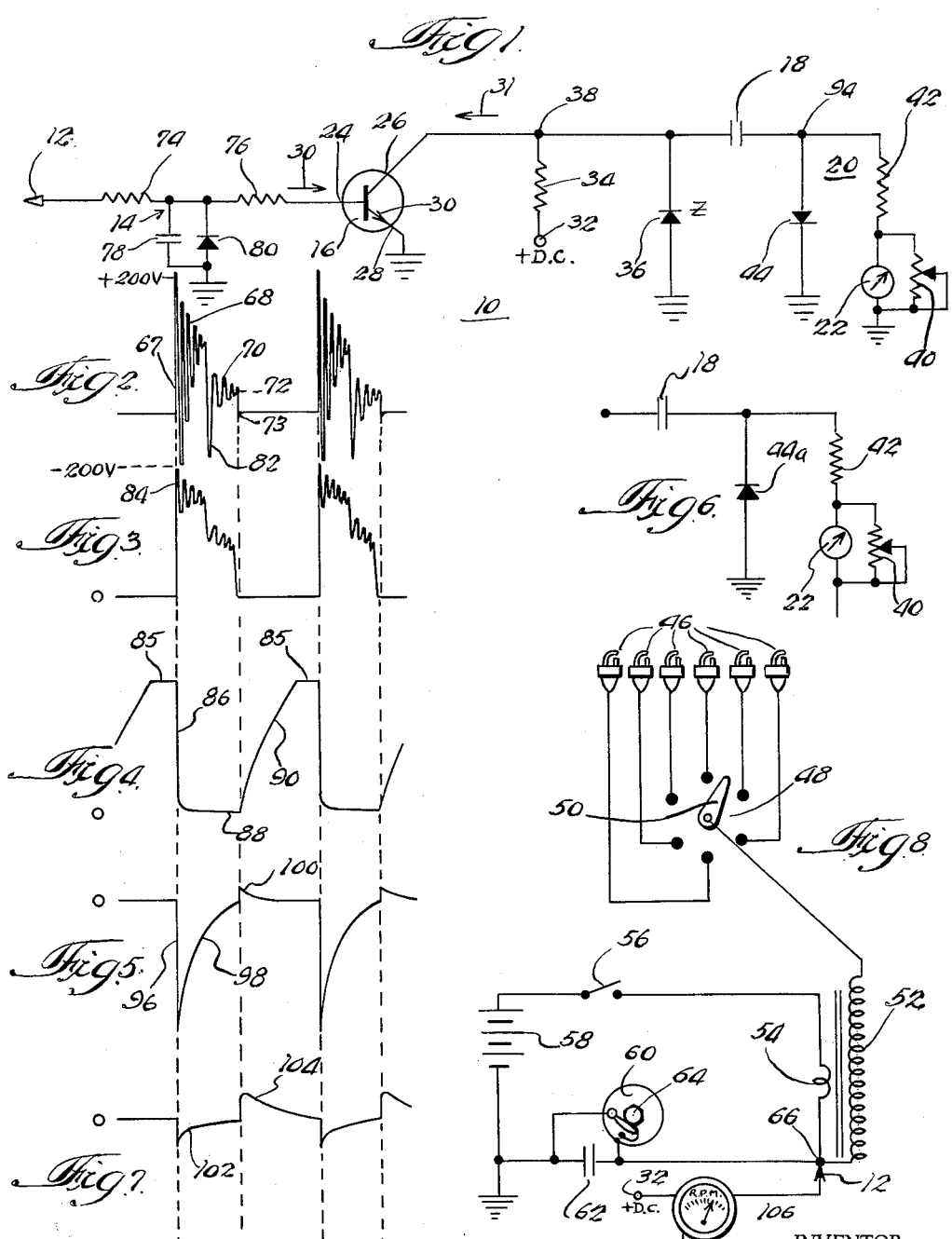
INVENTOR.
David F. Fathauer

United States Patent Office 3,202,910
Patented Aug. 24, 1965

3,202,910
AUTOMOTIVE TACHOMETER USING A
SWITCHED TRANSISTOR
David F. Fathauer, Macon, Ill., assignor to Radson Engineering Corporation, Macon, Ill., a corporation of Illinois
Filed May 13, 1958, Ser. No. 734,868
6 Claims. (Cl. 324—70)

This invention relates to rate indicating apparatus and more particularly to apparatus capable of providing a continuous indication of the rate of recurrence of any phenomenon when translated into a periodic electric signal.

The instant invention may be utilized to measure frequency, pulse repetition rate, rotative speed or any repetitive electric or mechanical phenomenon provided only that the variable to be measured can be converted into a periodic electric signal.

One principal use of this invention is the measurement of engine speed in automobiles and certain features of the invention render it particularly adapted to this use. However, as will appear from the description to follow, the invention is in no way limited to any particular use.

It is one object of this invention to provide an improved rate indicating device which is simple in construction and inexpensive to manufacture.

It is another object of this invention to provide an improved rate indicating device responsive to periodic electrical impulses which has a high degree of accuracy irrespective of the shape or magnitude of the impulses or variations of an associated power supply.

It is still a further object of this invention to provide an improved rate indicating device responsive to electrical periodic signals which is compact and capable of simple and immediate mounting in various environments.

It is still an additional object of this invention to provide an improved rate indicating device employing semiconductor elements in a unique configuration, the circuit requiring extremely small power inputs and producing negligible effects upon the signal being measured.

It is another important object of this invention to provide an improved engine tachometer for automotive use which is simple, accurate, inexpensive, compact, suited for unitary dashboard mounting and adapted for operation from the automotive electrical system.

Further and additional objects of this invention will become manifest from a consideration of this specification, the accompanying drawing, and the appended claims.

In one form of this invention an indicating device is provided including a transistor circuit acting as a gate or switch, utilizing a common emitter configuration and a regulated collector voltage supply employing a semiconductive diode exhibiting an athermal reverse voltage breakdown characteristic. For accurate measurements it is important that the signal applied to the transistor be sufficient to drive the device into full or maximum collector conduction.

More particularly, the above circuit is incorporated with an input circuit including a low pass filter and an indicating circuit including a sensitive meter movement and a unilateral rectifying device whereby low voltage ignition impulses and the conventional automotive electrical system may be utilized to produce accurate indications of engine speed without loading the ignition system.

For a more complete understanding of this invention reference will now be made to the accompanying drawing wherein:

FIG. 1 is a schematic circuit diagram of one embodiment of the invention;

FIG. 2 is a graphical representation of the primary voltage in a typical automotive ignition system;

FIG. 3 is a graphical representation of the voltage of FIG. 2 after removing the high frequency transients by filtering;

FIG. 4 is a graphical representation of the collector voltage in the circuit of FIG. 1;

FIG. 5 is a graphical representation of the meter voltage in the embodiment of FIG. 1;

FIG. 6 is an alternate meter circuit which may be substituted in the embodiment of FIG. 1;

FIG. 7 is a graphical representation of the meter voltage in the embodiment of FIG. 6; and FIG. 8 is a highly diagrammatic illustration of an automotive ignition system and the indicating apparatus of this invention in use therewith.

Referring now to the drawing and more particularly to FIG. 1, the circuit 10 of a rate indicating device in accordance with this invention is illustrated. While it will be apparent that the device may be employed to measure any repetitive phenomenon, the specific application which will be described in detail hereinafter is the use of the device as an automobile engine tachometer. The measurement and indication of engine speed is accomplished by sampling the ignition pulses in the primary circuit of the engine ignition system, amplifying the power of the ignition sample, initiating fixed charge pulses in an indicating circuit, and reading the indications.

Arrowhead 12 indicates an input connection which may be a terminal connection, probe, or the like, whereby the signal to be measured is applied through a filter network 14 to transistor 16. The transistor 16 is utilized to control the charge on capacitor 18. Capacitor 18 is charged through an indicating circuit 20 including a visually indicating ammeter 22. The angular movement of the indicating needle of meter 22 is substantially proportional to the total current therethrough and this current is directly related to the repetition rate of the periodic signal applied to input 12 as will be clear from the description which follows.

The transistor 16 in the embodiment of FIG. 1 is an NPN type connected in the common emitter configuration. Thus, as is well understood in the art at this time base connection 24 constitutes the input to transistor 16 and collector connection 26 constitutes the output, while emitter connection 28 constitutes the common transistor element generally corresponding to the cathode connection in conventional vacuum tube nomenclature. Use of the NPN type transistor in the common emitter configuration produces several advantages in the instant invention. The common emitter configuration provides current gain and the greatest obtainable power gain of all presently known transistor systems. Furthermore, in utilizing this invention in automotive systems it is desirable that both the input and output be positively biased and, as will appear, this is readily possible with the NPN grounded emitter configuration.

When a positive voltage appears at base 24 relative to emitter 28 (all references to voltage polarity will hereafter be with respect to the emitter connection or ground) a positive current flows in the direction indicated by arrow 30. This alters the distribution of minority carriers in the central transistor region whereby increased positive collector current flows in the direction indicated by arrow 31. Stated in another way, application of a positive voltage to base 24 lowers the effective impedance between collector 26 and emitter 28 whereby a positive bias voltage on collector 26 will produce substantially increased positive current as indicated by arrow 31.

The positive collector voltage is provided from a direct current source connected to terminal 32. This direct current source is preferably in the order of 5 to 15 volts for typical operation and in the case of modern automotive use this voltage would be between about 12 and 14.5 volts. The voltage of terminal 32 is applied through resistor 34 to collector 26.

As is well known, automotive electrical systems exhibit substantial changes in voltage level dependent upon the condition of the battery, the speed of operation and the particular voltage generating and charging system employed. Typically in a 12 volt automotive system, the system voltage will rise to the order of 14.5 volts during maximum battery charging periods. Such variations in collector voltage would produce serious errors in the rate indications of the instant invention unless means were provided for compensation thereof. For this purpose a semiconductive device 36 is connected between collector connection 26 and ground.

The collector connection 26 is normally maintained at a substantial positive voltage and the transistor in its quiescent state exhibits a high impedance. Thus, current in resistor 34 is extremely small and the voltage at test point 38 would approximate the supply voltage of 12 volts. The semiconductive device 36 is of the Zener type exhibiting a nondestructive reverse voltage breakdown characteristic which is extremely sharp and constant irrespective of reverse current over a wide range. Thus, when the voltage at terminal 38 is below the breakdown voltage of device 36 the voltage varies with the supply voltage at terminal 32. However, at voltages exceeding the breakdown voltage of device 36, the voltage at test point 38 will remain constant at the breakdown voltage. Thus the device 36 effectively becomes a voltage sensitive variable impedance in series with resistor 34 whereby current from terminal 32 through resistor 34 and device 36 varies in relationship to the applied voltage producing a variable voltage drop across resistor 34 and consequently a regulated voltage at test point 38. A typical voltage at this point would be in the order of 10 volts.

When a positive voltage is applied to base connection 24, the effective collector to emitter impedance becomes extremely small and consequently the voltage at test point 38 falls to substantially zero. When this occurs, storage capacitor 18, which has been charged to the breakdown voltage of device 36, discharges through transistor 16 producing a substantial current flow through indicating circuit 20 and consequently an indication on meter 22.

Indicating circuit 20 includes meter 22, a variable resistor 40 in parallel with meter 22 and a fixed resistor 42 in series therewith. Resistors 40 and 42 constitute a variable calibrating means. A rectifier 44 is connected in parallel with the meter 22 and its associated resistors 40 and 42 whereby substantially unilateral current passes through meter 22 during successive charging and discharging of storage condenser 18.

Thus, each time a positive impulse is applied to base 24, test point 38 approaches ground potential and condenser discharge current flows from terminal 38 through transistor 16, meter 22 and parallel resistor 40 and resistor 42. The total charge flowing and the time during which the current flows are substantially constant irrespective of the repetition rate of the input signal, provided the time constant of the indicating circuit is short compared to the repetition rate of the input signal.

At the end of the positive impulse on base 24, condenser 18 recharges to the breakdown voltage of device 36. The circuit for condenser charging is through resistor 34 and rectifier 44. The amount of reverse current passing through meter 22 and consequently negative deflection of the indicating needle is extremely small and dependent upon the forward resistance of rectifier 44. All ammeters have inherent inertia which is essential to the satisfactory operation of this indicating circuit. The impulses which the meter receives are of substantially fixed magnitude and duration and the meter acts as an averaging device over several impulses. Thus the actual needle deflection is proportional to the number of impulses per unit of time and consequently constitutes a rate indicating device or frequency meter.

The filter circuit 14 between probe 12 and base connection 24 is intended to eliminate any transients, harmonics or other high frequency phenomenon and enable the device to respond only to a single fundamental signal. Resistor 74 and condenser 78 constitute a low pass filter, resistor 76 merely functioning to raise the effective input impedance of the transistor and reduce loading of the source of impulses under test, and rectifier 80 functions to by-pass any possible negative excursions of the input signal, as the NPN type transistor operates only with a positive bias or input signal.

Referring to FIG. 8, a conventional automotive system is schematically illustrated and will be briefly described. A plurality of spark plugs 46 corresponding in number to the number of cylinders of the engine and a distributor 48 having a point corresponding to each of the spark plugs are shown. An engine driven rotating contactor 50 is connected in series with a high voltage coil winding 52 having several thousand turns. Magnetically coupled to winding 52 is a primary winding 54 having only a few hundred turns. Primary winding 54 is connected in series with an ignition switch 56, a battery 58 and a pair of breaker points 60 in parallel with a buffer condenser 62.

As is well known, breaker points 60 and distributor 48 are conventionally mounted in a single housing, and contactor 50 and cam 64 are driven together from the engine shaft. In conventional four cycle engines cam 64 has a point for each cylinder, and cam 64 and contactor 50 turn at one-half the engine speed. Thus in a six cylinder engine breaker 60 is closed for each 120° of engine rotation and breaker 60 opens while contactor 50 is in engagement with one of the distributor points. Engine ignition occurs upon breaking the points, as this produces a sharp flux change and high ignition voltages. The device of this invention, completely enclosed in meter housing 106, is shown with input probe 12 contacting one side of winding 54 at test point 66.

A typical voltage characteristic across winding 54 is illustrated in FIG. 2. While breaker 60 is closed, the voltage at point 66 is zero. When the breaker points open, the voltage rises abruptly along line 67 to a peak value in the order of 200 volts and the oscillating effect of coil 52 in series with the stray capacitances associated with the circuit produces the transient 68. As the energy in the coil is dissipated, the spark collapses in plug 46 producing a second transient 70 about the ignition supply voltage shown as 72. The voltage at test point 66 returns to zero when the breaker 60 again closes as shown on the curve at point 73. The transient may become negative momentarily as indicated at negative peak 82. The entire cycle is repeated at regular intervals during normal engine operation and two complete cycles are here illustrated. Filter 14, as already described, is intended to eliminate the transients, enabling the rate indicator to sense only the principal impulse. The voltage at base connection 24 of transistor 16 is graphically shown in FIG. 3. The maximum value 84 will be in the order of several volts and the voltage will be substantially zero during a major portion of each cycle. The same time scale and zero time datum are employed in FIGS. 2–7.

One feature of this invention is the sensing of engine ignition impulses without detrimental loading effects in the ignition circuit. Thus, resistors 74 and 76 should be relatively large, for example, in the order of 3000 ohms, whereby the current through the input circuit of transistor 16 will be of the order of only a milliampere in typical common emitter transistor input configurations. In typical NPN common emitter transistor configurations, input impedances are in the order of 1000 ohms and the output impedances are much higher. Input currents in the order of one milliampere are adequate to produce collector current in the range of 20 to 100 milliamperes.

Thus the current gain in a configuration of this type is in the order of 20 to 100 with substantially higher power gains.

The voltage appearing at test point 38 is plotted at FIG. 4. There it can be seen that the normal collector voltage is normally steady at the Zener value for diode device 36, namely, line 85. A positive impulse at base 24 produces a sudden and abrupt change in collector voltage illustrated by the steep curve 86. The steady state voltage when the base is passing substantial current is illustrated by curve portion 88 which is an extremely small value when compared to the applied voltage. When the applied positive signal is removed from base 24 the storage condenser 18 is charged through load resistor 34 and rectifier 44, and the collector voltage at test point 38 during this time is illustrated by curve 90 in FIG. 4. The voltage at test point 38 continues to rise until the breakdown voltage of device 36 is reached.

The voltage at test point 94 is illustrated in FIG. 5. When the positive impulse is applied to base 24 rendering the collector circuit highly conductive, condenser 18 is rapidly discharged producing a substantial negative voltage across the indicator 20. This rapid change is indicated by line 96 in FIG. 5. As the storage condenser 18 discharges, the voltage at point 94 follows the transient curve 98. The voltage at point 94 approaches zero as the condenser 18 is completely discharged. It is necessary for accurate operation of this device that the value of condenser 18 be correlated with the value of resistor 42 and 40 and the impedance of meter 22 and transistor 16 to provide a time constant such that, at the maximum rate to be measured, curve 98 will always closely approach the zero value prior to initiation of additional cycle as already described above.

Upon removing the positive voltage from base 24, condenser 18 is again charged to the maximum value permitted by device 36 as already discussed. This charging occurs through rectifier 44 which substantially bypasses meter 22. However, a small positive voltage peak appears at point 94 as illustrated by curve 100 resulting from the forward resistance of the rectifier 44. In conventional semiconductor rectifiers this will generally be in the order of fifty ohms.

In the alternate construction illustrated in FIG. 6 the rectifier 44a is merely reversed, the remaining circuitry including condenser 18, meter 22, rheostat 40 and resistor 42 are identical. In this configuration, discharge of storage condenser 18 occurs through reversed rectifier 44a producing the small negative excursions 102 illustrated in FIG. 7. Upon removal of the positive input signal, condenser 18 charges through the meter circuit in series with load resistor 34 producing the voltage characteristic illustrated by curve 104. Because of the relative large impedance of resistor 34 the curve 104 does not exhibit the extreme peak shown for the reverse connection in FIG. 5 and the charging period is extended over a longer period of time. This configuration, while eliminating the high peak voltages, reduces the maximum range of impulse rates for a given configuration in that additional charging time is required.

In one typical embodiment of this invention the filter 14 includes a condenser 78 of .1 mfd. and a resistor 74 of 3300 ohms. The input resistor 76 has a resistance of 3300 ohms and load resistor 34 has a resistance of 470 ohms. The semiconductive device 36 has an athermal straight line breakdown characteristic at 10 volts, the condenser 18 has a capacity of .5 mfd., the resistor 42 has a value of 470 ohms and the variable resistance 20 has a maximum value of 200 ohms. Utilizing this configuration the filter has a cut-off frequency sufficiently high to pass all fundamental frequencies normally encountered in automotive ignition systems and, similarly, the indicating circuit is capable of utilization with frequencies up to the maximum ignition rate. The meter movement will have adequate inertia to render average indications directly related to the average voltage over several repetitions of the impulses.

While one particular embodiment of this invention has been described in detail it will be apparent that various configurations may be immediately created by one skilled in the art in view of the teaching of this invention. For example, while an NPN type transistor in a grounded emitter configuration has special advantages of maximum power gain, desirable input and output impedances, and special usefulness with positive power supplies, other transistors and other configurations may be employed without departing from the spirit and scope of this invention.

It is contemplated that the circuit illustrated in FIG. 1 may be incorporated within a meter housing as diagrammatically shown in FIG. 8 whereby housing 106 may be mounted on an automotive dashboard and grounded there with only two connections therefrom being required. The first will be terminal 32 connected to the automotive electrical system and the second will be input 12 connected in the primary circuit of the ignition system.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An engine tachometer for providing an indication of the speed of an internal combustion engine having an ignition system which generates periodic electrical impulses, said tachometer comprising meter means indicating the magnitude of a unidirectional electric current flowing therethrough, storage capacitance means and resistance means connected in series between said meter means and a source of known potential, a semiconductive device having an athermal constant voltage breakdown characteristic connected to the common terminal of said storage capacitor and said resistance means and connected to the other terminal of said meter means, the polarity of said semiconductive device with respect to said source of known potential being such that the semiconductive device is normally conducting in the breakdown region, a transistor having at least base, emitter, and collector connections, and an input low pass filter connected between said emitter connection and said base connection and having an input conductor adapted for connection to said ignition system, substantially unidirectionally conductive means in said input means whereby the voltage appearing between said emitter and base connections is of one polarity only, said transistor having said collector connection and one of the other of said connections operatively connected to the two terminals of said semiconductive device.

2. The engine tachometer of claim 1 wherein all of the component parts are disposed within the housing of said meter means with said input conductor and a conductor for connection to said source of known potential extending therefrom.

3. An engine tachometer for providing an indication of the speed of an internal combustion engine having an ignition system which generates periodic electrical impulses, said tachometer comprising meter means indicating the magnitude of a substantially unidirectional flow of electric current, rectifier means in parallel with said meter means to provide substantially unidirectional flow in said meter means, storage capacitance means and resistance means connected in series between one common terminal of said rectifier means and meter means and a source of known potential, a semiconductive device having an athermal constant voltage breakdown characteristic connected to the common terminal of said storage capacitor and said resistance means and to the other common terminal of said meter means and rectifier means, the polarity of said semiconductive device being such that it is normally conducting in the breakdown region, a transistor having at least base emitter and collector connections, input means for applying periodic electrical impulses of irregular waveshape from said engine between said emitter and base connection, said input means including low pass filter means and substantially unidirectional conductive means whereby only portions of said periodic electrical impulses below a predetermined frequency and of one polarity are applied to said emitter and base connection, said transistor having said collector connection and one of the other of said connections operatively connected to the two terminals of said semiconductive device.

4. A tachometer for internal combustion engines comprising a meter having a casing adapted to be mounted on the instrument panel of an automobile, a circuit secured to and carried by the meter casing, a first conductor leading from the circuit to the negative side of a battery, a second conductor leading from the circuit to the positive side of the battery and a third conductor leading from the circuit to the primary terminal of the engine distributor, said first conductor terminating at the negative connection of the meter, said second conductor leading through a resistor, a capacitor and a second resistor in the sequence named and terminating at the positive connection of the meter, said third conductor leading through a first resistor, thence through a second resistor and thence to a transistor connected across said first and second conductors, a rectifier diode connected across said first and second conductors and a rheostat connected across said first and second lines whereby the impulses from the distributor are converted to uni-directional pulses to effectively actuate said meter.

5. A tachometer for the internal combustion engine of an automotive vehicle comprising a meter casing adapted to be mounted on the instrument panel of the vehicle, a current-responsive meter in said casing having a positive terminal and a negative terminal, a circuit secured to the back of said meter casing and carried thereby, first, second and third conductors extending from said circuit and adapted to be connected respectively to the positive and negative battery terminals and the distributor of the vehicle engine, said circuit including a first resistor, a capacitor and a second resistor connected in that order in series between the positive battery terminal conductor and the positive terminal of the meter, a transistor having a pair of output electrodes and a control electrode, one of said output electrodes of the transistor being connected to the juncture between said first resistor and said capacitor, the other of said output electrodes of the transistor being connected to the negative battery terminal conductor and connected directly to the negative terminal of the meter, a unidirectional conducting device having its positive terminal connected to the juncture between said capacitor and said second resistor and its negative terminal connected directly to said other output electrode of the transistor, whereby said capacitor and said unidirectional conducting device are connected in series with each other across the output electrodes of the transistor, and current conducting means connecting said control electrode of the transistor to the distributor conductor for causing the transistor to conduct and discharge the capacitor through the meter in response to an impulse from the distributor.

6. Speed indicating apparatus comprising a capacitor, a source of regulated voltage for charging said capacitor to a predetermined voltage, a meter in series with said capacitor for measuring and indicating said capacitor charging current, a transistor connected to said voltage source independently of said meter, means responsive to a moving member for producing pulses having a frequency proportional to the speed of said moving member, means for supplying said pulses to said transistor and rendering said transistor conductive in response thereto, means for restricting current flow through said meter when said capacitor is discharging, a first series circuit including said transistor, said capacitor and means bypassing said meter for discharging said capacitor independently of said meter when said transistor is rendered conductive, and a second series circuit including said meter, said capacitor and said source for regulated voltage for charging said capacitor independently of said transistor when said transistor is rendered nonconductive.

References Cited by the Examiner

UNITED STATES PATENTS

| 2,559,849 | 7/51 | Covert | 324—70 |
| 2,572,788 | 10/51 | Weighton | 324—70 X |
| 2,751,553 | 6/56 | McEntee | 324—70 |
| 2,927,268 | 3/60 | Haggai et al. | 324—70 |
| 2,934,703 | 4/60 | Cohen | 324—70 |
| 2,944,215 | 7/60 | Corson | 324—81 |

OTHER REFERENCES

Transistor Frequency Meters, by L. R. Blake, Electronic Engineering, August 1956, pages 322 to 327.

WALTER L. CARLSON, *Primary Examiner.*

SAMUEL BERNSTEIN, LLOYD McCOLLUM,
*Examiners.*